United States Patent
Debnath et al.

(10) Patent No.: US 11,250,244 B2
(45) Date of Patent: Feb. 15, 2022

(54) ONLINE FACE CLUSTERING

(71) Applicant: NEC Laboratories America, Inc., Princeton, NJ (US)

(72) Inventors: Biplob Debnath, Princeton, NJ (US); Giuseppe Coviello, Princeton, NJ (US); Srimat Chakradhar, Manalapan, NJ (US); Debayan Deb, Okemos, MI (US)

(73) Assignee: NEC Corporation

( * ) Notice: Subject to any disclaimer, the term of this patent is extended or adjusted under 35 U.S.C. 154(b) by 49 days.

(21) Appl. No.: 16/814,453

(22) Filed: Mar. 10, 2020

(65) Prior Publication Data

US 2020/0293759 A1    Sep. 17, 2020

Related U.S. Application Data

(60) Provisional application No. 62/816,416, filed on Mar. 11, 2019.

(51) Int. Cl.
 *G06K 9/00*    (2006.01)
 *G06K 9/62*    (2006.01)

(52) U.S. Cl.
 CPC ....... *G06K 9/00288* (2013.01); *G06K 9/6215* (2013.01); *G06K 9/6218* (2013.01)

(58) Field of Classification Search
 CPC .. G06K 9/0028; G06K 9/6218; G06K 9/6215; G06K 9/622; G06K 9/00771; G06K 9/00295
 See application file for complete search history.

(56) References Cited

U.S. PATENT DOCUMENTS

| | | | |
|---|---|---|---|
| 8,189,880 B2 | 5/2012 | Wen et al. | |
| 8,605,957 B2 | 12/2013 | Mochizuki et al. | |
| 8,769,556 B2 | 7/2014 | Guo et al. | |
| 8,781,179 B2 | 7/2014 | Begeja et al. | |
| 9,514,353 B2 | 12/2016 | Zhang et al. | |
| 2012/0206605 A1* | 8/2012 | Buehler | G08B 13/19645 348/159 |
| 2013/0111509 A1* | 5/2013 | Guo | H04H 60/65 725/12 |
| 2013/0148898 A1* | 6/2013 | Mitura | G06K 9/6271 382/195 |
| 2016/0125232 A1* | 5/2016 | Zhang | G06K 9/00288 382/103 |

\* cited by examiner

*Primary Examiner* — Edward F Urban
*Assistant Examiner* — Wassim Mahrouka
(74) *Attorney, Agent, or Firm* — Joseph Kolodka

(57) ABSTRACT

Methods and systems for image clustering include matching a new image to a representative image of a cluster. The new image is set as a representative of the cluster with a first time limit. The new image is set as a representative of the cluster with a second time limit, responsive to a determination that the new image has matched at least one incoming image during the first time limit.

20 Claims, 5 Drawing Sheets

ONLINE FACE CLUSTERING

RELATED APPLICATION INFORMATION

This application claims priority to U.S. Provisional Patent Application No. 62/816,416, filed on Mar. 11, 2019, incorporated herein by reference herein its entirety.

BACKGROUND

Technical Field

The present invention relates to face matching, and, more particularly, to grouping similar images of faces together under a shared identifier.

Description of the Related Art

As video surveillance proliferates, there develops a greater need for managing large-scale face recognition and mapping, including active analysis of video feeds to actively monitor security threats in real-time. For example, considering an exemplary scenario with hundreds, or even thousands, of video cameras being installed in a large shopping center, video analytics can be used to gain insights into shopping behavior to provide a more personalized experience for customers. Face clustering is used to combine face images that are captured across multiple video streams, grouping similar face images, such that each cluster of images includes the face images of a single person.

SUMMARY

A method for face clustering includes matching a new image to a representative image of a cluster. The new image is set as a representative of the cluster with a first time limit. The new image is set as a representative of the cluster with a second time limit, responsive to a determination that the new image has matched at least one incoming image during the first time limit.

A method for image clustering includes a hardware processor and a memory that is operatively coupled to the hardware processor and that stores a program. When the program is executed by the processor, the program is configured to compare a new image to representative images of a plurality of clusters, to determine a respective similarity score for each cluster of the plurality of clusters. The program determines that the new image has an above-threshold similarity score for multiple matched clusters, merges the multiple matched clusters into a new cluster, and adds the new image to the new cluster.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide scalable face detection and clustering in video surveillance systems. Given a stream of face images, the present embodiments determine a set of disjoint groups, such that each group includes similar faces of a single person. Toward that end, the present embodiments address the fact that the true number of different identities, represented in the many face images, is unknown. Furthermore, the number of clusters is large and is changing continuously, as new patrons enter the area and as the cameras continue to capture face images from different directions and poses. Additionally, the feature vector used to identify a particular face is unknown—instead the present embodiments make use of pairwise similarity between face images.

The present embodiments include multiple approaches to clustering face images. Faces are added to clusters based on their similarity to images already in such clusters. A threshold is used to determine whether the input faces are sufficiently similar to an existing cluster. If so, the input faces are added to respective existing clusters. If not, new clusters can be created. If an input face is similar to multiple existing clusters, this can be used to merge the clusters.

Figure 1:
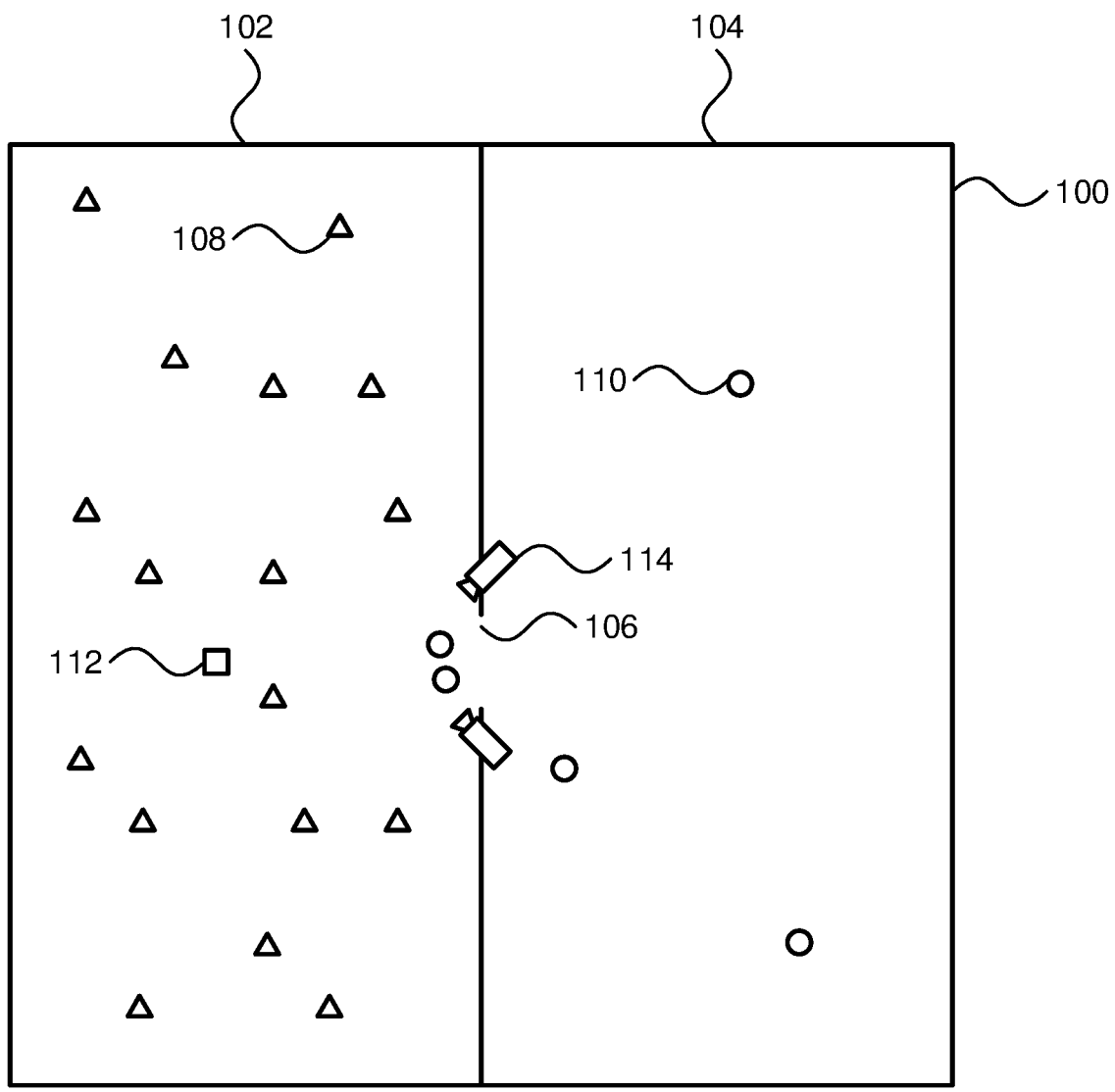
FIG. 1 is a diagram of an exemplary environment that is monitored by multiple video cameras, in accordance with an embodiment of the present invention.

Referring now to FIG. 1, an exemplary monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is a banned individual 112, shown as a square. The unauthorized individuals 108 are permitted access to the uncontrolled region 102, but not to the controlled region 104. The authorized individuals are permitted access to both the uncontrolled region 102 and the controlled region 104. The banned individual 112 is not permitted access to either region.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104. Additional monitoring devices (not shown) can be used as well, for example to capture radio-frequency identification (RFID) information from badges that are worn by authorized individuals 108.

It should be understood that there may be many video cameras 114 positioned throughout the environment 100. Additionally, it should be understood that some embodiments may not create a distinction between controlled region 104 and uncontrolled region 102, for example in embodiments where all of the environment 100 is open to the general public. In such embodiments, there may not be a distinction between authorized individuals 110 and unauthorized individuals 112.

As noted above, the present embodiments provide clustering for face images detected by multiple different video cameras 114. Face clustering can then be used to link individuals across multiple different locations and multiple different views, allowing for tracking of individuals through a space. For example, an individual's movements may be tracked to determine their interests and preferences, making it possible to direct targeted advertisements to the individual. As another example, an individual's movements may be tracked to identify suspicious behavior, for example if the individual moves from a sensitive area to an exit, or enters a store, picks up an item, and proceeds to customer service to attempt returns fraud.

Figure 2:
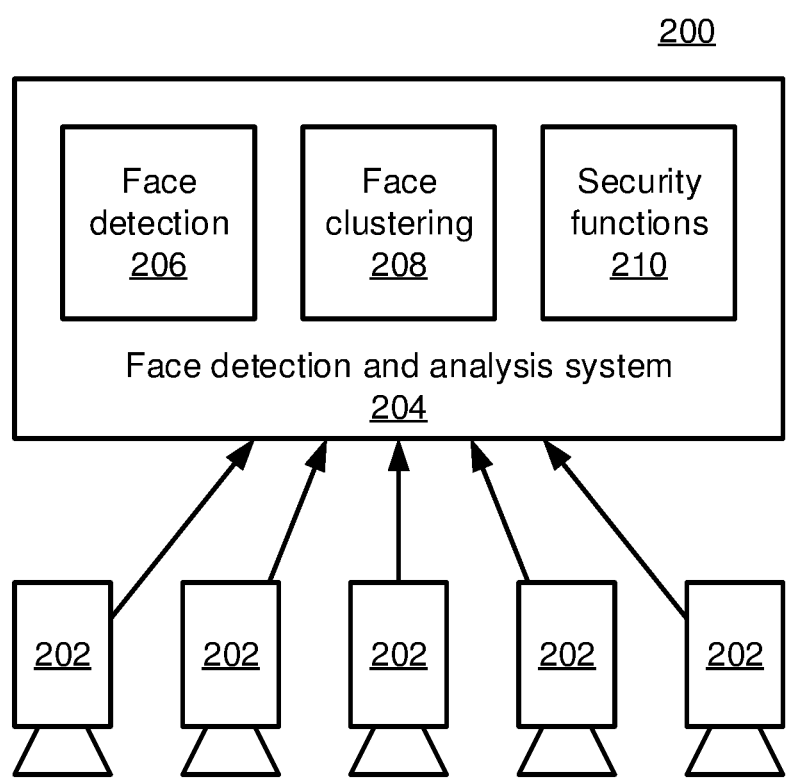
FIG. 2 is a diagram of a video monitoring and analysis system with multiple video cameras, in accordance with an embodiment of the present invention.

Referring now to FIG. 2, a block diagram of a surveillance system 200 is shown. A set of video cameras 202 are in communication with a face detection and analysis system 204, each generating a respective video stream. The face detection and analysis system 204 receives the streams and performs a set of functions, including face detection 206 within images of each stream, face clustering 208 within respective streams, face clustering 208 between different streams, and one or more security or response actions 210.

The face detection and analysis system 204 thus first detects faces in a live video stream. For each face, it then generates a template using face detection 206. This template can later be used to identify similar faces among the face images. For face clustering 208, the face detection and analysis system 204 takes a face, represented by a feature vector, and assigns the face to a cluster of similar faces. The face, along with its cluster information, can be saved in a database, which can be used for subsequent analytics queries and security actions 210.

One challenge that the face detection and analysis system 204 handles is that of scalability. Stream-processing is often executed in main memory. When large numbers of video streams are being processed simultaneously, the memory usage can become very large, particularly when clustering faces across multiple streams. The present embodiments can therefore process the video streams in a parallel manner, for example with multiple distinct hardware systems being used to implement the face detection and analysis system 204.

Face clustering 208 is performed as quickly as possible, to provide a high degree of responsiveness for user analytics queries. Additionally, streaming faces from live video feeds tend to be bursty, and can be generated very rapidly in times of peak traffic. A new face needs to be compared to all existing clusters, or at least a subset thereof, to assign the new face to a cluster. However, while indexing would be helpful to speed up determining the similarity between face images, the general unavailability of feature vector representations of faces with commercially available face recognition systems renders the use of an index infeasible. Even if such feature representations were available, an index would not help speed up neural network-based face recognition.

The present embodiments therefore employ scanning to compare an incoming face image to all previously processed faces. The face image can be assigned to a cluster, or, if no matching face is found, can be used to form a new cluster. One challenge to resolve with face clustering 208 is that similarity measures can lack transitivity. Transitivity implies that, if Face A is similar to Face B, and if Face B is similar to Face C, then Face A is similar to face C. However, because similarity is measured between each pair of face images, some images may not show sufficient similarity to one another to satisfy transitivity. Particularly when operating in real-time, a new face image for an individual may not be accurately clustered to the individual's other face images right away.

It can be challenging to check a face image against every face image in a given cluster, as the size of the cluster can grow large. A cluster representative can therefore be selected, for example using the first seen face, the last seen face, the face with the best quality or frontal score, a random face image, or a fixed face image or subset of face images. While using a cluster representative can speed matching, it can also decrease accuracy. These problems can be addressed, for example, by merging clusters, if an incoming face matches multiple clusters.

It should be understood that, although the present embodiments are described with a particular focus on the matching of faces, any appropriate form of image matching can be used instead. Thus, the present embodiments can encompass matching between images of any appropriate subject, and using any appropriate metric for similarity.

Figure 3:
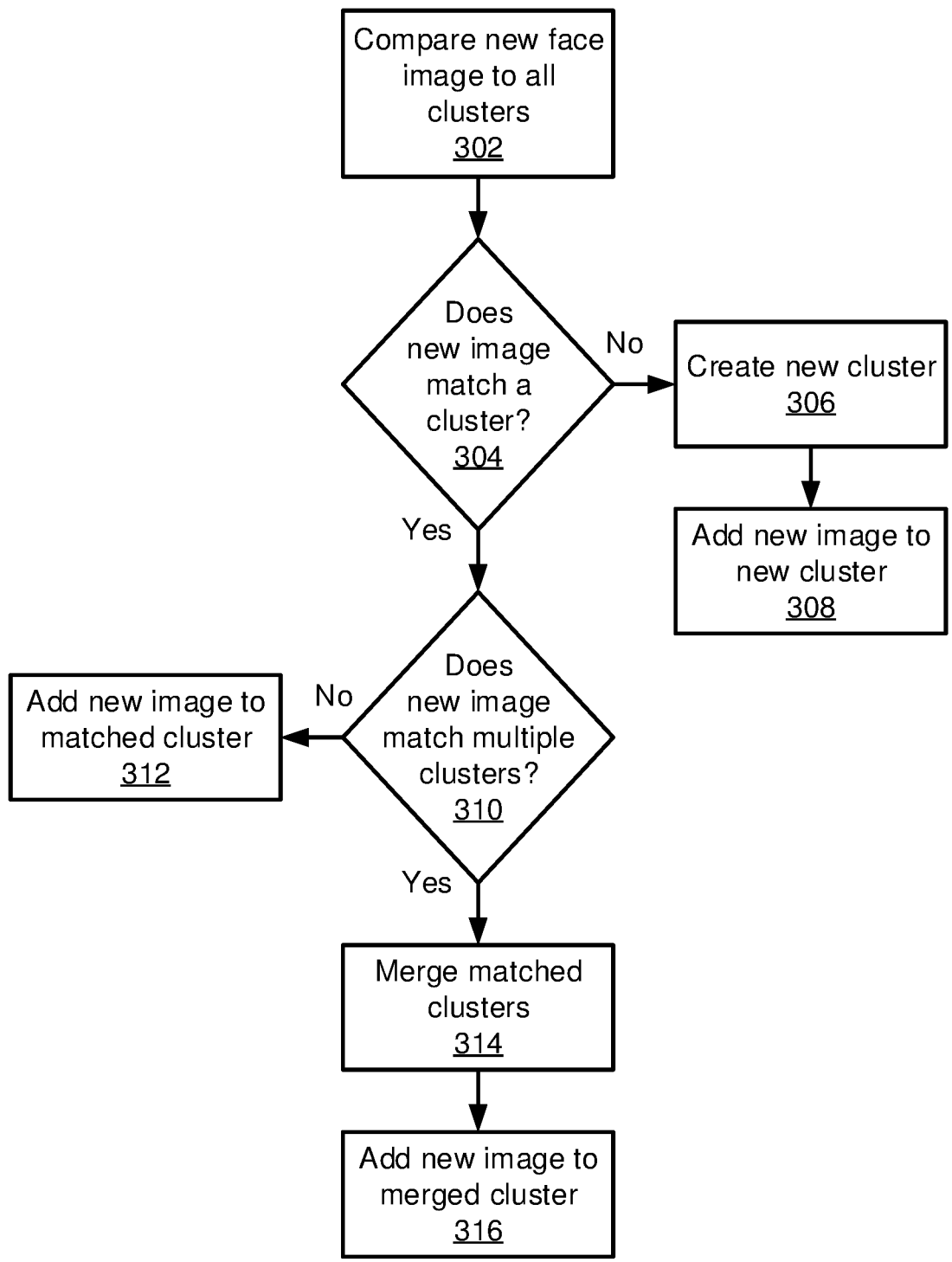
FIG. 3 is a block/flow diagram of a method for clustering face images detected from video streams, in accordance with an embodiment of the present invention.

Referring now to FIG. 3, a method for performing face clustering is shown. Block 302 compares a new face image against all currently existing clusters. This comparison can be between a feature vector of the new face image and feature vectors representing the clusters. It should be understood that the comparison can be performed using any appropriate comparison metric, and any appropriate feature embedding—the details of these processes are not needed for the implementation of the present embodiments. Any suitable tool for providing a comparison between two face images, with a similarity score between them, is suitable.

Block 304 determines whether the new face image matches an existing cluster. If not, block 306 creates a new cluster, and block 308 adds the new face image to the new cluster. If at least one cluster matches the new image, block 310 determines whether the new face image matches multiple clusters. If not, block 312 adds the new face image to the existing cluster that it matches.

If multiple clusters are matched, block 314 merges the matched clusters into a single cluster that includes all of the stored face images from all of the matched clusters. Block 316 then adds the new face image to the merged cluster. To prevent merge cascading, which could result in all of the face images eventually being merged to a single cluster, the present embodiments can use a merge threshold, distinct from a similarity threshold used to assign the new face image to a single cluster. Thus, the merge threshold, which would trigger merging clusters, can be set higher than the similarity threshold. For example, the present embodiments can add about 5% to the similarity threshold to determine the merge threshold.

Face clustering can be readily parallelized by, e.g., splitting the clusters to be matched across different physical processing systems. In a parallel processing embodiment, the clusters can be divided across multiple processing systems, with each processing system comparing the new face image to the locally stored clusters, and then collecting the resulting similarity scores at a central processing system, to determine the new cluster membership. Clusters can be assigned to processing system by any appropriate scheme, for example with more similar clusters being assigned to the same processing systems, thereby facilitating merging of collocated clusters.

In some embodiments, recently matching results can be stored in a high-speed cache. This can facilitate high-speed matching, with the understanding that an individual may appear in multiple streams in a short time period, for example walking across multiple cameras' fields of views. When a new face image is received for cluster assignment, it can first be matched with the cached faces. If a match is found in the cache, then no further matching need be performed, and the scan of the other clusters can be skipped. Additionally, the feature vectors in some embodiments can be stored in an array-based data structure, to take advantage of modern processors' high performance in sequential accesses, due to prefetching. Each entry in the array can include, for example, a face identifier, a feature vector, an image quality assessment, a reference time, a lifetime, and a cluster assignment.

To increase the efficiency of face matching in block 302, the present embodiments may divide matching into two phases, with the first phase clustering the face at the level of a single video stream, and with the second phase clustering faces across the video streams. In local clustering, faces are clustered in small batches in a sliding time window within each live stream. For example, the window length can be set to ten seconds, but it should be understood that any appropriate time length can be used. To improve clustering accuracy, other factors, such as body location within the video stream, can be used to address facial recognition challenges that arise due to pose, illumination, and expression. The local clustering assigns a unique cluster identifier to each local cluster. The faces can then be sorted based on the quality (or frontal score) estimated from various face landmarks. This ordering can be used to select the face with the highest quality or frontal score as the candidate for clustering, while the lower-quality face images can be discarded. The next time window can use the same cluster identifier for similar faces.

During a global clustering phase, faces from the first phase are clustered against all of the clusters detected so far, for example using the cache described above. The two-phase clustering process decreases the time complexity of face matching, as only those faces which are not in the cache (e.g., those faces which have not been seen for some time) will need to be matched across the full set of clusters.

Figure 4:
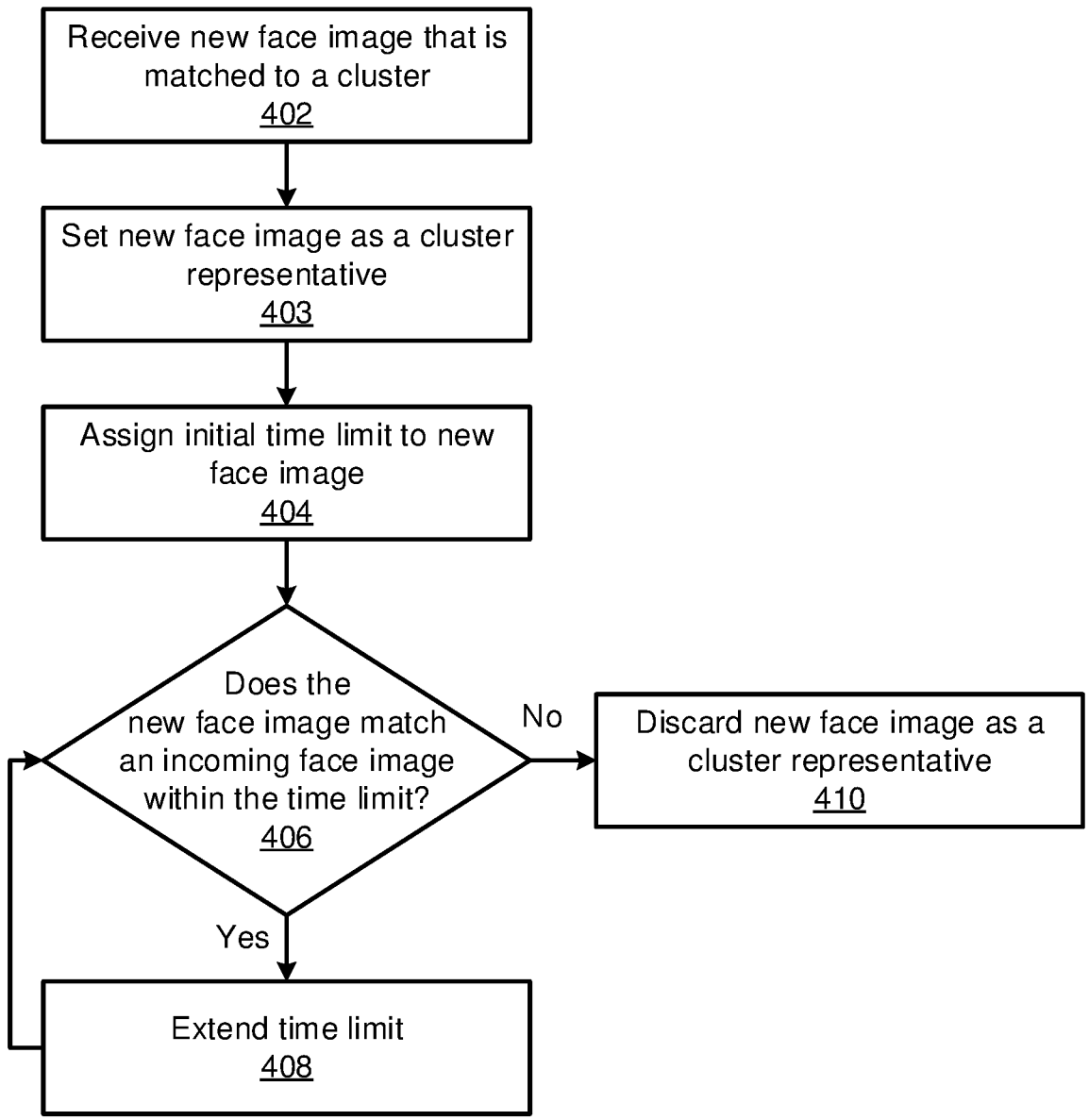
FIG. 4 is a block/flow diagram of a method for determining representative face images for clusters, in accordance with an embodiment of the present invention.

Referring now to FIG. 4, a method for selecting representative face images for a cluster is shown. Block 402 receives a new face from a video stream, which has been matched to a particular cluster. The new face image is set as a representative of the cluster in block 403. Each new face that is assigned to a cluster is evaluated for its utility, as compared to other representatives in the cluster. The utility of a face image is estimated by its ability to match an incoming face to the cluster.

Block 404 assigns an initial time limit (e.g., one second) to the new face image to act as a representative of the cluster. Block 406 then determines whether the new face image matches one or more incoming face images within the initial time limit. If so, block 408 extends the time limit, for example to one hour. Processing then returns to block 406, which continues to evaluate the utility of the new face image. As long as the face image continues to be useful in matching incoming faces in block 406, the time limit continues to be extended in block 408. Once the time limit has expired, block 410 removes it as a representative of the cluster. Thus, the cluster representative selection process is dynamic, and the number of representatives per cluster is not fixed, but instead varies with time.

This heuristic represents a credit-based selection. Each representative image is assigned a credit in terms of lifetime. Once the "credit" runs out, the image is discarded. Cluster representatives can then be divided into strong and weak representatives. All representative images are initially assigned, in block 404, to the weak group, and only a subset of them are promoted to the strong group in block 408. Additional credit is given to those face images that demonstrate utility.

In some embodiments, the weak credit (e.g., the amount of time assigned in block 404) can be determined as:

$$credit_{weak} = credit_{min} + \left(1 - \frac{score}{threshold}\right) * creditunit$$

The term $credit_{min}$ refers to a predetermined lifetime, for example 150 seconds. The parenthetical term measures how close the weak representative is to current representatives—the score term represents a similarity, while the threshold term represents a similarity threshold, above which a score is regarded as reflecting images to be clustered. The threshold term can be set to any appropriate value, and can be determined empirically. The term creditunit refers to a predetermined time, such as one second. For example, if the score is 0.71, and the threshold is 0.71, then the estimated credit will be very close to $credit_{min}$. In contrast, if the score were 0.99, then the estimated credit would be much less than $credit_{min}$. A high score here refers to the fact that the new representative is more similar to existing representatives, as compared to lower similarity scores. Longer initial lifetimes are given to face images that are dissimilar to existing representatives.

If a representative face image is the only image in the cluster that produces a match to a new face image, then only it is promoted to the strong group and granted a maximum credit (e.g., one hour) by block 408. If a strong representative generates an exclusive match, then block 408 grants additional maximum credit.

In the event that multiple representative face images from the cluster match the new face image, then two cases are considered. In the first case, all representatives belong to a "weak" group. In this first case, the weak representative face image with the best match to the new face image is promoted to the strong group. In the second case, at least one of the matched representative face images already belongs to the strong group. In this second case, no action is taken.

In some embodiments, a limit can be put on the total number of representative face images. When the limit is reached, representative face images can be discarded in least-recently-used order based on their remaining lifetime. When there are no representative images left in a cluster, the cluster can be discarded.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
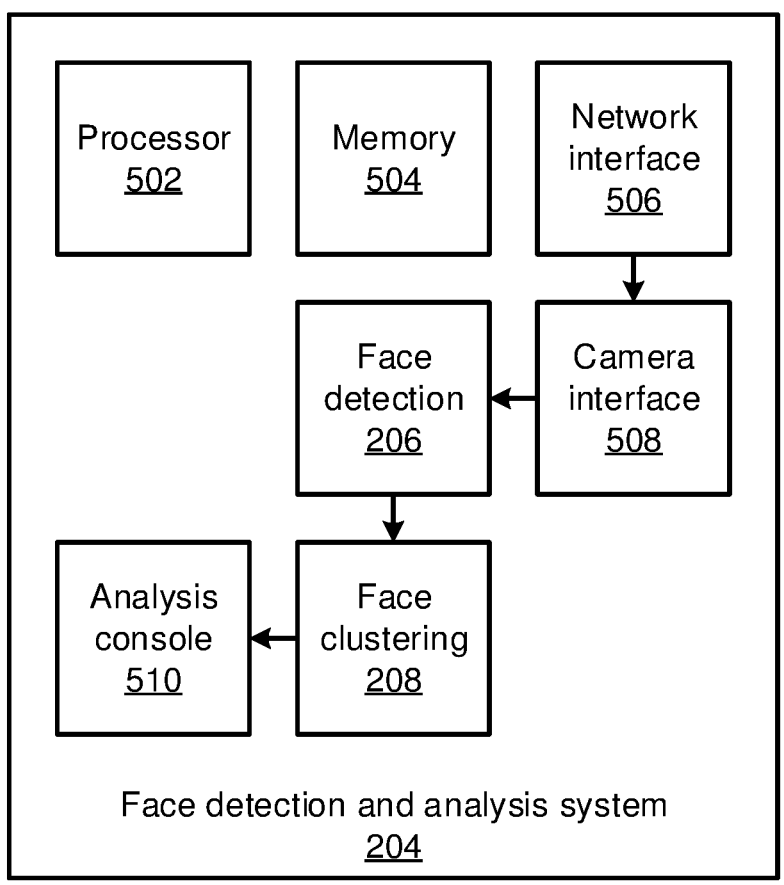
FIG. 5 is a block diagram of a face detection and analysis system, in accordance with an embodiment of the present invention.

Referring now to FIG. 5, additional detail on the face detection and analysis system 204 is shown. The system 204 includes a hardware processor 502 and memory 504. A network interface 506 communicates with, for example, the video cameras 202, by any appropriate wired or wireless communications medium and protocol. A camera interface 508 collects video streams from the video cameras 202. In some embodiments, the camera interface 508 can communicate with the video cameras 202 using the network interface 506. In other embodiments, the camera interface 508 can include a physical interface that communicates with the video cameras 202 directly.

The present embodiments include functional modules that can be implemented as software that is stored in memory 504 and that is executed by hardware processor 502. In other embodiments, one or more functions can be embodied as one or more discrete hardware components, for example in the form of ASICs or FPGAs.

Face detection 206 is performed on the video streams received by the camera interface 508. Face detection 206 identifies face images within the image stream. Face clustering 208 then matches the detected face images to the representative images of the existing face clusters, creating a new cluster if there is no match. Face clustering 208 also manages the selection of representative face images for the clusters, as described above. Face clustering 208 also manages cluster merging, when incoming faces are strong matches to multiple clusters.

As incoming faces are assigned to clusters, analysis console 510 operates to perform analytics. These analytics can include tracking individuals through an environment 100, identifying individuals of interest, for example those who are banned, and tracking shopping behaviors. The analysis console 510 can perform queries, for example looking up information regarding a particular face cluster that is stored in the memory 504. The analysis console 510 can, in some embodiments, take automatic actions responsive to particular conditions. For example, if a detected individual is shown in an environment after hours, an alert can be triggered that, for example, notifies security personnel or that automatically triggers a security action, such as locking doors.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for image clustering, comprising:
matching a new image to a representative image of a cluster;
adding the new image to the cluster;
setting the new image as a representative of the cluster with a first time limit; and
setting the new image as a representative of the cluster with a second time limit, responsive to a determination that the new image has matched at least one incoming image during the first time limit.

2. The method of claim 1, further comprising determining a similarity score for an incoming image by a comparison between the incoming image and the new image.

3. The method of claim 2, further comprising determining that the similarity score exceeds a similarity threshold to determine that the new image matches the incoming image.

4. The method of claim 1, wherein the second time limit is longer than the first time limit.

5. The method of claim 1, further comprising tracking an individual through a space, based on a correspondence between images in the cluster and one or more sensors that captured the images in the cluster.

6. The method of claim 1, wherein the new image and the incoming images are face images.

7. The method of claim 1, further comprising:
comparing a third image to representative images of a plurality of clusters to determine a respective similarity score for each cluster of the plurality of clusters;
determining that the third image has an above-threshold similarity score for multiple matched clusters;
merging the multiple matched clusters into a new cluster; and
adding the third image to the new cluster.

8. The method of claim 7, wherein each cluster of the plurality of clusters has a different number of representative images.

9. The method of claim 7, wherein the determination that the new image has matched at least one incoming image is based on comparison of a similarity score to a first threshold, wherein determining that the third image has an above-threshold similarity score for multiple matched clusters is based on a second threshold, and wherein the second threshold is greater than the first threshold.

10. The method of claim 1, further determining that a time limit for the new image has expired and dropping the new image as a representative of the cluster responsive to the expiration of the second time limit.

11. The method of claim 1, further comprising:
determining that a number of representative images from the cluster has exceeded a maximum number; and
dropping an image as a representative image of the cluster that has a lowest remaining time limit.

12. A system for clustering, comprising:
a hardware processor;
a memory, operatively coupled to the hardware processor, that stores a program that, when executed by the processor, is configured to:
compare a new image to representative images of a plurality of clusters, to determine a respective similarity score for each cluster of the plurality of clusters;
determine that the new image has an above-threshold similarity score for multiple matched clusters;
merge the multiple matched clusters into a new cluster; and
add the new image to the new cluster; and
set the new image with a first time limit as the representative image of the new cluster.

13. The system of claim 12, wherein the new image and the representative images are face images.

14. The system of claim 12, wherein the program is further configured to set the new image as a representative image of the new cluster.

15. The system of claim 12, wherein the program is further configured to determine that the new image matches one or more incoming images during the predetermined first time limit.

16. The system of claim 15, wherein the program is further configured to set the new image with a second time limit as the representative image.

17. The system of claim 16, wherein the second time limit is longer than the first time limit.

18. The system of claim 12, further comprising an analysis security console configured to track an individual through a space, based on a correspondence between images in a cluster of the plurality of clusters and one or more sensors that captured the images in the cluster.

19. The system of claim 12, further comprising an analysis console configured to track an individual's path through an environment that is monitored by multiple video streams, based on a cluster of images associated with the individual, and to perform a security action responsive to the individual's path.

20. A method for image clustering, comprising:
comparing a new image to representative images of a plurality of clusters, to determine a respective similarity score for each cluster of the plurality of clusters;
determining that the new image has an above-threshold similarity score for multiple matched clusters;
merging the multiple matched clusters into a new cluster;
adding the new image to the new cluster; and
setting the new image with a first time limit as the representative image of the new cluster.

* * * * *